(No Model.)

A. HAMANN.
Glass Button and Mold for Manufacturing the Same.

No. 236,022.　　　　　　　　Patented Dec. 28, 1880.

WITNESSES:　　　　　　　　　　　　INVENTOR:

UNITED STATES PATENT OFFICE.

AUGUST HAMANN, OF HOBOKEN, NEW JERSEY, ASSIGNOR TO JOHN A. DEKNATEL, OF BROOKLYN, NEW YORK.

GLASS BUTTON AND MOLD FOR MANUFACTURING THE SAME.

SPECIFICATION forming part of Letters Patent No. 236,022, dated December 28, 1880.

Application filed September 28, 1880. (No model.)

*To all whom it may concern:*

Be it known that I, AUGUST HAMANN, of Hoboken, in the county of Hudson and State of New Jersey, have invented a new and Improved Glass Button and Mold, of which the following is a specification.

The invention consists in an improved glass button and a mold for attaching the eye thereto, as hereinafter described.

Figure 1:
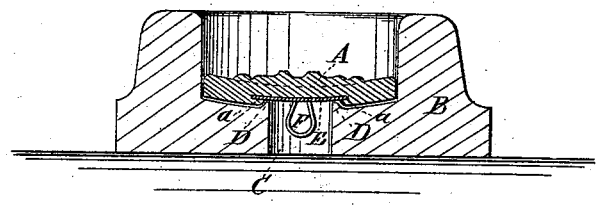
Figure 2:
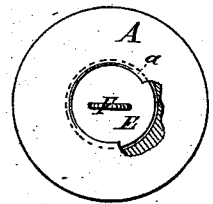

In the accompanying drawings, Figure 1 is a cross-sectional elevation of my improved button and of the die in which it is made. Fig. 2 is a plan view of the rear side of my improved button, showing a part broken out.

Similar letters of reference indicate corresponding parts.

The button A is made in a die, A, having a recess of the same shape as that which the button is to have, and this die has a central aperture, C, in the bottom, which aperture has a shoulder, D, at the upper edge, this shoulder forming an annular ridge rising from the bottom of the recess of the die.

A cap or plate, E, which has a larger surface than the cross-section of the aperture C, is placed upon the ridge or shoulder D, and consequently overlaps it. If a mass of molten glass or other melted material of which the button is to be made is now pressed into the die by means of a suitable punch, it fills up the annular recess formed by the shoulder D and causes the glass to overlap the edge of the cap E, as shown at *a*, and when the glass hardens a portion of it overlaps the edge of the cap E, thereby uniting the cap E firmly to the glass button. An eye, E, or loop F, or any other suitable device for attaching the button to garments, is attached to the under side of the cap E.

In the use of my improved button the strain upon the eye is distributed through the cap, which is firmly attached to the glass at all parts of the circumference of the cap, and thus a very strong attachment between the eye, the cap, and the glass is obtained, which also permits of making the glass button much thinner and lighter than those heretofore made.

Having thus fully described my invention, I claim as new and desire to secure by Letters Patent—

1. For the manufacture of glass buttons, the mold A, with a ridge or shoulder, D, at the upper edge of its central aperture, C, substantially as herein shown and described, to facilitate the overlapping of the glass upon the edges of the cap, as set forth.

2. A glass button having its eye F secured thereto by a plate, E, embedded in and overlapped by the glass, substantially as shown and described.

AUGUST HAMANN.

Witnesses:
OSCAR F. GUNZ,
C. SEDGWICK.